(12) United States Patent
Weichenberger et al.

(10) Patent No.: US 11,531,328 B2
(45) Date of Patent: Dec. 20, 2022

(54) MONITORING AND CONTROLLING AN OPERATION OF A DISTILLATION COLUMN

(71) Applicant: Accenture Global Solutions Limited, Dublin (IE)

(72) Inventors: Jurgen Albert Weichenberger, Surrey (GB); Mohamad Mehdi Nasr-Azadani, Menlo Park, CA (US); Zaid Tashman, San Francisco, CA (US); Matin Momeni, London (GB); Teresa Sheausan Tung, Tustin, CA (US)

(73) Assignee: Accenture Global Solutions Limited, Dublin (IE)

( * ) Notice: Subject to any disclaimer, the term of this patent is extended or adjusted under 35 U.S.C. 154(b) by 73 days.

(21) Appl. No.: 17/301,252

(22) Filed: Mar. 30, 2021

(65) Prior Publication Data
US 2021/0325864 A1    Oct. 21, 2021

Related U.S. Application Data

(60) Provisional application No. 63/011,744, filed on Apr. 17, 2020.

(51) Int. Cl.
*G05B 23/02* (2006.01)
*B01D 3/42* (2006.01)
*G06N 7/00* (2006.01)

(52) U.S. Cl.
CPC ........ *G05B 23/0254* (2013.01); *B01D 3/4211* (2013.01); *G05B 23/021* (2013.01); *G05B 23/024* (2013.01); *G06N 7/005* (2013.01)

(58) Field of Classification Search
CPC .............. G05B 23/0254; G05B 23/021; G05B 23/024; B01D 3/4211; G06N 7/005
See application file for complete search history.

(56) References Cited

U.S. PATENT DOCUMENTS

| 8,615,387 B2 * | 12/2013 | Boys | G06F 30/20 703/9 |
| --- | --- | --- | --- |
| 10,316,254 B2 * | 6/2019 | Molina | B01J 27/051 |

(Continued)

OTHER PUBLICATIONS

Extended European Search Report for Application No. EP21168675.3, dated Sep. 13, 2021, 8 pages.

*Primary Examiner* — Mohammad K Islam
(74) *Attorney, Agent, or Firm* — Harrity & Harrity, LLP (57) ABSTRACT

In some implementations, a control system may obtain historical data associated with usage of a distillation column during a historical time period. The control system may configure a prediction model to monitor the distillation column for a hazardous condition. The prediction model may be trained based on training data that is associated with occurrences of the hazardous condition. The control system may monitor, using the prediction model, the distillation column to determine a probability that the distillation column experiences the hazardous condition within a threshold time period. The prediction model may be configured to determine the probability based on measurements from a set of sensors of the distillation column. The control system may perform, based on the probability satisfying a probability threshold, an action associated with the distillation column to reduce a likelihood that the distillation column experiences the hazardous condition within the threshold time period.

20 Claims, 6 Drawing Sheets

(56) References Cited

U.S. PATENT DOCUMENTS

2012/0011180 A1 1/2012 Kavaklioglu
2018/0284741 A1 10/2018 Cella et al.

\* cited by examiner

MONITORING AND CONTROLLING AN OPERATION OF A DISTILLATION COLUMN

CROSS-REFERENCE TO RELATED APPLICATION

This Patent Application claims priority to U.S. Provisional Patent Application No. 63/011,744, filed on Apr. 17, 2020, and entitled "MONITORING AND CONTROLLING AN OPERATION OF A DISTILLATION COLUMN." The disclosure of the prior Application is considered part of and is incorporated by reference into this Patent Application.

BACKGROUND

A petroleum refining process may involve use of a distillation column. The distillation column receives crude oil. The crude oil is heated, supplied to the distillation column, and distilled within the distillation column to transform the crude oil into various products, such as gasoline, naphtha, kerosene, diesel oil, fuel oil, and/or lubricating oil. Residue from distilling the crude oil may have other uses, such as creating bitumen for road surfaces.

SUMMARY

In some implementations, a method includes obtaining historical data associated with usage of a distillation column during a historical time period; processing the historical data to identify a plurality of operating states of the distillation column; determining, based on a set of parameters from the historical data, occurrences of a hazardous condition during the historical time period while the distillation column was operating according to an operating state of the plurality of operating states; configuring a prediction model to monitor the distillation column for the hazardous condition, wherein the prediction model is trained based on training data that is associated with the occurrences of the hazardous condition; monitoring, using the prediction model, the distillation column to determine a probability that the distillation column experiences the hazardous condition within a threshold time period, wherein the prediction model is configured to determine the probability based on measurements from a set of sensors of the distillation column; and perform, based on the probability satisfying a probability threshold, an action associated with the distillation column to reduce a likelihood that the distillation column experiences the hazardous condition within the threshold time period.

In some implementations, a device includes one or more memories; and one or more processors, communicatively coupled to the one or more memories, configured to: process, using a clustering technique, historical data to identify a plurality of operating states of a distillation column; determine, based on a first set of parameters from the historical data, occurrences of a hazardous condition during a historical time period while the distillation column was operating according to an operating state of the plurality of operating states; generate a prediction model for monitoring the distillation column for the hazardous condition; train the prediction model based on training data that is associated with the occurrences of the hazardous condition, wherein the training data includes historical sensor data and historical control data that is associated with a second set of parameters; monitor, using the prediction model, the distillation column to determine a probability that the distillation column is going to experience the hazardous condition within a threshold time period, wherein the prediction model is configured to determine the probability based on measurements from a set of sensors of the distillation column; and perform, based on the probability satisfying a probability threshold, an action associated with the distillation column.

In some implementations, a system may include a distillation column; a plurality of sensors to monitor a flow of fluid through the distillation column; one or more control devices to control the flow of fluid through the distillation column; and a controller that is configured to: obtain historical data associated with the distillation column; process the historical data to identify a plurality of operating states of the distillation column; determine, based on a set of parameters from the historical data, occurrences of a hazardous condition during a historical time period while the distillation column was operating according to an operating state of the plurality of operating states; generate a prediction model to monitor the distillation column for the hazardous condition; train the prediction model based on training data that is associated with the occurrences of the hazardous condition; and perform an action associated with monitoring the distillation column using the prediction model.

DETAILED DESCRIPTION

The following detailed description of example implementations refers to the accompanying drawings. The same reference numbers in different drawings may identify the same or similar elements.

Distillation columns are components within the hydrocarbon refining process. The distillation columns enable long-chain hydrocarbons to be broken into various elements, from which various products can be formed. The performance and life-time of distillation columns can be critical to a refinery and/or the success of an entity that owns and/or operates the refinery. While some previous techniques consider factors associated with monitoring the performance of a distillation column to control certain operations of the distillation column, such techniques fail to consider potential long-term effects on elements of the distillation column, and/or the distillation column as a whole. Accordingly, while certain adjustments to operate a distillation column can provide improved performance in the near-term and/or prevent or mitigate a hazardous condition in the near term, such operations may have negative long-term effects that reduce the useful life of the distillation column.

Moreover, due to the physical configuration and/or design of certain distillation columns, monitoring for certain hazardous conditions may not be possible. For example, a distillation column may be configured in such a way that retroactively outfitting the distillation column with sensors and/or sensor systems is not feasible. More specifically, retroactively outfitting the distillation column with such sensors and/or sensor systems may not be possible due to the complexity of the existing distillation column (e.g., due to multi-physics phenomena when the distillation column is under extreme conditions, resulting in multiple unpredictable variables involving fluid mechanics, chemistry, reactive flows, transport phenomenon, phase-changes, and/or multiphase changes). Furthermore, retroactively outfitting the distillation columns with sensors and/or sensor systems may not be possible due to design constraints associated with sensors or the distillation column and/or may not be cost effective due to required downtime of the distillation column). Furthermore, replacement of an existing distillation column (which can be over 110 meters tall and weigh over 2,000,000 kilograms) with a distillation column that is configured to be monitored for improved long-term performance involves relatively large amounts of hardware resources, design resources, human resources, among other types of resources.

Some implementations, described herein, provide a system that enables monitoring and/or control of a distillation column (e.g., an existing or preconfigured distillation column). For example, as described herein, one or more models may be trained based on historical data associated with the distillation column. The system may be configured to, using the one or more models, determine an operating state of the distillation column, detect a probability of a hazardous condition occurring (e.g., within a threshold period of time) under the operating state, and/or control the distillation column to reduce the probability. Additionally, or alternatively, the system may be configured to control the distillation column according to a targeted remaining life-time (e.g., determined according to an optimization model and/or a rated maximum remaining life-time) of the distillation column.

Accordingly, the system may provide or include a 'fault-aware' control system for operating the distillation column. Such a control system may combine real-time optimization techniques and/or an optimal policy adoption strategy, along with fault prediction models (e.g., one or more models that are individually developed and/or trained for corresponding hazardous conditions) in a transparent and robust manner. For example, the control system may combine a data-driven approach with a physics-driven modeling approach to infer complex underlying processes or situations (e.g., flooding and/or coke buildup, among other examples) in an efficient manner without simulating results (e.g., via a computational fluid dynamics (CFD) simulation, including a high fidelity CFD simulation that includes relatively large amounts of computing resources and power), which involves relatively large amounts of processing resources, memory resources, and/or the like and may be relatively inaccurate because such a simulation may not consider specific characteristics of the distillation column (e.g., historical usage and/or types of unique operating states of the distillation column).

In some implementations, one or more artificial intelligence (AI) techniques, such as machine learning, deep learning, and/or the like are used to identify an operating state of a distillation column, determine a probability that the distillation column experiences a hazardous condition within a threshold period of time, and/or control an operation of the distillation column. Such techniques may be implemented to generate and/or train one or more models (e.g., one or more AI models, such as a state detection model, a prediction model, and/or an optimization model) based on historical data associated with the distillation column and/or other distillation columns (e.g., other distillation columns that share same or similar characteristics). Further, such techniques may consider certain parameters of the distillation column that include one or more sensor measurements that may be interpreted to identify an amount of a buildup of a material (e.g., a liquid, coke/deposits, and/or the like) within a packing of the distillation column and/or a detected amount of corrosion of one or more elements (e.g., overhead lines) of the distillation column.

As described herein, one or more of the models may be trained based on historical (and/or empirical) data associated with the distillation column. Additionally, or alternatively, the historical data may be associated with other distillation columns that are associated with the distillation column, such as distillation columns configured in a similar manner (e.g., same size/shape and/or configured to perform similar hydrocarbon refining processes) and/or distillation columns associated with a same entity that owns and/or operates the distillation column. The control system may utilize the one or more models to identify, infer, and/or predict a hazardous condition (e.g., an upset condition, a non-operational condition, and/or a failure), based on an analysis of real-time measurements (e.g., from various types of sensors configured to measure operating parameters of the distillation column) and historical information associated with the distillation column (e.g., usage information, content of processed feed, quantity of processed feed, performance characteristics and/or feed types, and/or the like). As previously mentioned, certain hazardous conditions (e.g., flooding and/or coke buildup, among other examples) of the distillation column may not be easily detectable (e.g., using a single sensor or set of sensors) due to the physical configuration of the distillation column, accessibility issues, and/or the nature of the hazardous conditions. Accordingly, the one or more models may be trained using historical data associated with such hazardous conditions to permit the control system to identify the hazardous conditions and/or predict that the hazardous conditions are likely to occur. In this way, the control system may utilize the one or more models to control the distillation column to avoid the hazardous conditions and/or provide information associated with the operations of the distillation column to permit an operator to identify a state of the distillation column and/or a potential upcoming hazardous state of the distillation column (e.g., so that the operator may prevent the distillation column from entering a hazardous state).

In this way, the control system described herein may facilitate control of a distillation column that extends a useful life of the distillation column, thereby reducing a consumption of hardware resources (e.g., hardware of components) of the distillation column, reducing downtime associated with the distillation column (e.g., by avoiding more frequent maintenance to the distillation column), reducing consumption of computing resources relative to previous simulation techniques, and improving the efficiency of the distillation column.

Figure 1A:
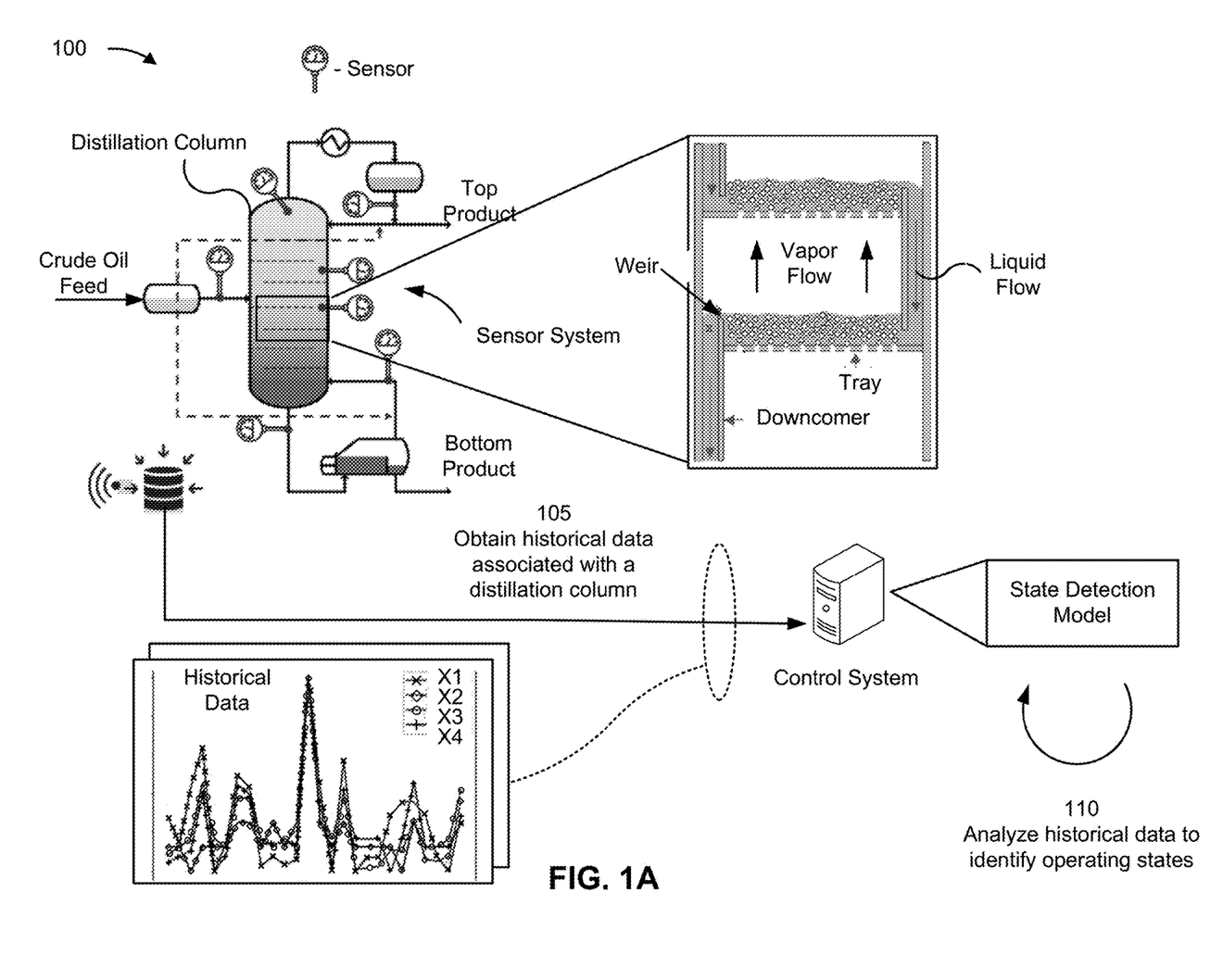
FIGS. 1A-1C are diagrams of an example implementation described herein.
Figure 1B:
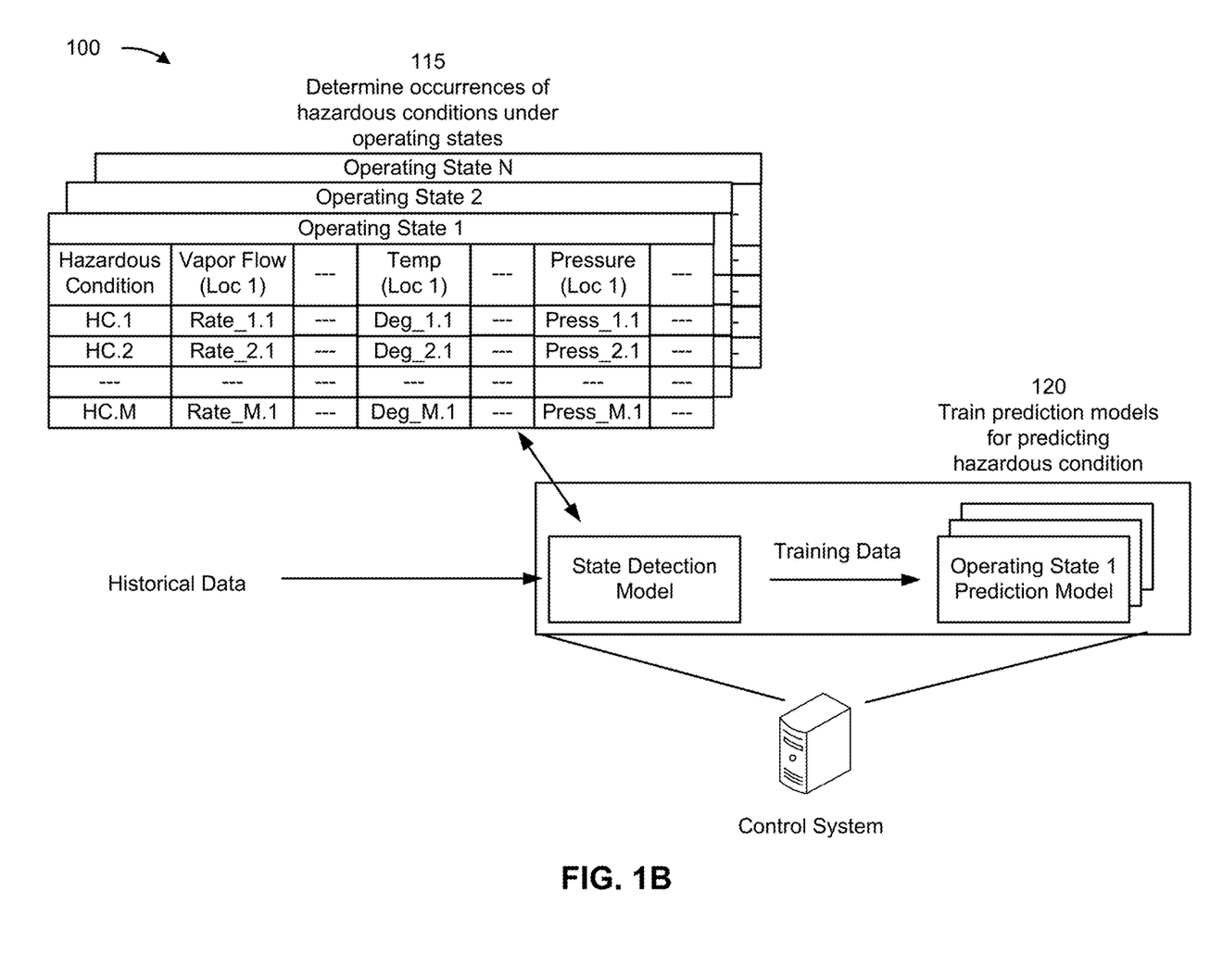
Figure 1C:
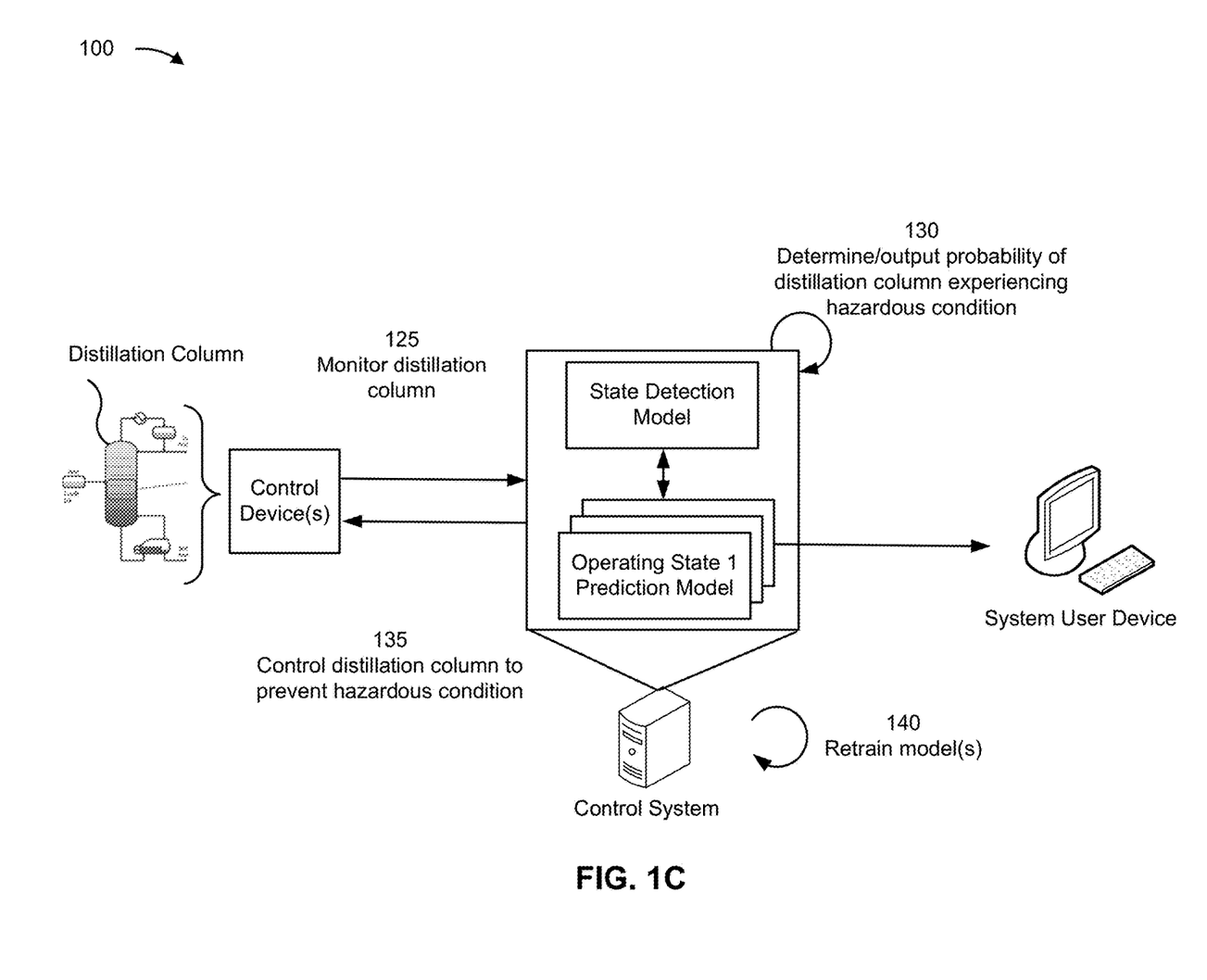

FIGS. 1A-1C are diagrams of an example implementation 100 associated with monitoring and/or controlling an operation of a distillation column. As shown in FIGS. 1A-1C, example implementation 100 includes a distillation column, a sensor system, a control system, and a system user device. These devices are described in more detail below in connection with FIG. 2 and FIG. 3.

The distillation column may include one or more mechanisms for distilling crude oil to produce one or more products, as described herein. For example, the distillation column may include trays positioned at various levels (e.g., heights) of the distillation column that are configured to correspondingly facilitate production or extraction of one or more products (e.g., gasoline, naphtha, kerosene, diesel oil, fuel oil, and/or lubricating oil, among other examples). The distillation column may include passageways (e.g., openings of sieves in the trays and/or downcomers) between the trays that permit, according to physics, vapors and liquids to flow through the distillation column concurrently.

For example, due to physics, vapors in the distillation column may flow upward from tray to tray through sieves in the trays and liquids in the distillation column may flow downward from tray to tray, through downcomers and across the sieves in the trays. The distillation column may have a mechanical configuration that is designed to allow the vapors and/or the liquids to flow at certain rates between the trays. A hazardous condition (e.g., flooding and/or coke buildup, among other examples) may occur that affects the flow of the fluids through the distillation column. For example, one hazardous condition may include flooding, which involves liquid of a downcomer overflowing a weir of a tray, thereby backfilling the tray with liquid. For example, flooding may be caused from an accumulation of excessive liquid above a tray or weir slowing down (e.g., within the tray or relative to a downward flow) and/or from the excessive liquid obstructing the flow and exchange of energy between liquid and the vapor phase. Flooding may be caused by a rate of a transition of a vapor to a liquid occurring too quickly at a particular level of the distillation column.

As shown in FIG. 1A, and by reference number 105, the control system obtains historical data associated with a distillation column. For example, the control system (or a model of the control system) may receive the historical data during a training period associated with training a state detection model, a prediction model, and/or an optimization model, as described herein. Additionally, or alternatively, the training period may correspond to a historical period associated with usage of the distillation column. For example, during the historical period (e.g., a duration of weeks, months, years, or more), sensor measurements and/or control settings may have been recorded in association with operating the distillation column. Accordingly, the historical data may be obtained from a data structure (e.g., a database, an index, a file, an electronic document, and/or the like) associated with the distillation column.

The historical data may include information associated with one or more parameters of the distillation column during certain events, under certain conditions, and/or during certain time periods. For example, the historical data may include information associated with temperatures measured at certain locations of the distillation column, pressures measured at certain locations of the distillation column, fluid flow rates at certain locations of the distillation column, input rates of crude oil into the distillation column, one or more characteristics of the crude oil supplied to the distillation column (e.g., type and/or source information, such as source location and/or supplier information), output rates of certain products from the distillation column, results of gamma scans performed on the distillation column, operator logs (e.g., logs that include records associated with certain events associated with one or more operations of the distillation column) recorded while operating the distillation column, settings for one or more control devices of the distillation column (e.g., set-points for one or more components configured to control the flow of liquids or vapors at particular locations of the distillation column), and/or the like. Additionally, or alternatively, the historical data may include and/or indicate occurrences of hazardous conditions or upsets occurring at particular points of time. Such information can be expressly indicated (e.g., in association with a supervised learning technique) and/or inferred based on certain sensor measurements and/or control settings at a particular time period. In this way, the historical data, as described herein may be used to train one or more AI models.

In example 100, a graph of historical data represents values of collected usage training data identified by X1, X2, X3, and X4. For example, X1, X2, X3, and/or X4 may represent various parameters (e.g., one or more historical temperature measurements, one or more historical pressure measurements, one or more historical vapor flow rates, and/or the like), various control settings (e.g., one or more set points of one or more control devices of the distillation column), measurements of a parameter during different historical time periods, and/or settings of a control device during different historical time periods. Historical data of the training data may be graphed according to one or more sets of characteristics associated with the historical usage of the distillation column. For example, the control system may monitor and/or obtain sensor measurements and/or control settings to identify corresponding patterns associated with one or more operating states of the distillation column and/or one or more patterns associated with occurrences of hazardous conditions. The control system may identify such patterns according to timing (e.g., time of day, time of week, time of month, and/or time of year) of the sensor measurements and/or control settings and/or according to identified relationships between sensor measurements, between control settings, and/or between sensor measurements and control settings.

Although certain examples are described herein in connection with the historical data being associated with the distillation column, the historical data may include historical data that is associated with one or more other distillation columns. For example, the one or more other distillation columns may be associated with the distillation column based on being a same type of distillation column, based on having a same mechanical configuration (e.g., same size, same shape, same components, and/or same layout of trays and/or downcomers, among other examples), and/or based on being associated with a same entity (e.g., owner and/or operator) of the distillation column. In this way, as described herein, a model can be trained based on historical data that is associated with the distillation column and/or one or more other distillation columns. As described herein, historical data may include historical sensor data, historical inspection data (e.g., data associated with historical gamma scans or other types of inspections) historical control data (e.g., including historical set points of control devices), historical operator input data (e.g., operator inputs to the control devices and/or historical operator annotations or operator log entries associated with operating the distillation column), and/or the like.

As further shown in FIG. 1A, and by reference number 110, the control system analyzes the historical data to identify operating states. For example, the state detection model of the control system may analyze the historical data to identify one or more operating states of the distillation column. The state detection model may utilize a classification technique (e.g., a clustering technique) to classify the historical data and/or historical set points of the distillation column into corresponding subsets of historical data for individual operating states of the plurality of operating states. For example, the state detection model may include a K-means clustering model and/or a Gaussian mixture model and/or a Hidden Markov Model that is/are configured to identify one or more operating states based on classifications of parameters of the historical data.

The operating states may represent certain conditions or settings under which the distillation column was operating during the historical time period. In some implementations, an operating state may be defined by individual measurements being within particular ranges and/or individual control settings (set points) being configured at particular settings. Additionally, or alternatively, the operating states may correspond to the distillation column be configured to produce particular products at particular rates (e.g., a first product at a first rate, a second product at a second rate, and so on).

As shown in FIG. 1B, and by reference number 115, the control system determines occurrences of hazardous conditions under the identified operating states. For example, the control system may identify the occurrences of certain hazardous conditions based on values of various parameters (e.g., a vapor flow rate, liquid flow rate, a temperature, a pressure, a level of liquid, a fluid composition, and/or a heat exchange rate, among other examples) at one or more locations of the distillation column. In example 100, the control system may infer the occurrences of M hazardous conditions (shown as HC.1 and HC.2 to HC.M) from training data and/or parameters of the historical data. For example, the control system, using the state detection model, may infer the occurrences of hazardous conditions under a particular operating condition, based on a vapor flow rate at a location, based on a temperature at the location, and/or based on a pressure at the location. More specifically, the control system may identify the hazardous condition HC.1 based on Rate_1.1 being within a vapor flow rate range associated with an occurrence of HC.1, based on Deg_1.1 being within a temperature range associated with an occurrence of HC.1, and/or based on Press_1.1 being within a pressure range associated with an occurrence of HC.1.

The training data may include historical sensor data associated with historical sensor measurements and/or historical control data that is associated with historical control settings that are mapped to the occurrences of certain hazardous conditions (e.g., flooding and/or coke buildup). Correspondingly, using the training data and/or the state detection model, the control system can infer (e.g., from identified patterns of historical measurements and/or control settings) and/or identify the occurrence of certain types of hazardous conditions (e.g., from indications in the training data from an operator or other user).

As further shown in FIG. 1B, and by reference number 120, the control system trains one or more prediction models for predicting one or more corresponding hazardous conditions (e.g., HC.1, HC.2, and so on). As shown, the prediction models may be configured for particular operating states. For example, the control system may a train a first prediction model (shown as operating state prediction model 1) to predict that a hazardous condition is likely to occur within a threshold period of time. The control system (or another model generation/training device) may generate, configure, and/or train a prediction model based on training data provided from the state detection model. The training data may include and/or identify the occurrences of the hazardous conditions (and/or types of the hazardous conditions) along with corresponding historical data during historical time periods associated with the occurrences of the hazardous conditions. For example, training data for a particular occurrence of a hazardous condition may include historical sensor measurements and/or control settings during a time period that starts before the occurrence of the hazardous condition (e.g., to identify sensor measurements and/or control settings indicating the hazardous condition) and ends after the occurrence of the hazardous condition (e.g., to identify sensor measurements and/or control settings indicating that the hazardous condition has ended and/or control settings used to end the hazardous condition). Accordingly, the training data may include historical sensor data associated with time periods prior to the occurrences of the hazardous conditions, historical control data from time periods prior to the occurrences of the hazardous conditions, historical sensor data from time periods after the occurrences of the hazardous conditions, and/or historical control data from time periods after the occurrences of the hazardous conditions.

The control system (or another model generation system or an optimization engine) may configure a prediction model to predict that a hazardous condition is going to occur when operating under the operating state based on determining a probability that the distillation column is going to experience the hazardous condition within a threshold time period (e.g., a time period that is associated with the hazardous condition). The duration of the threshold time period may be specific to the hazardous condition. Accordingly, the control system (or another model generation system) may train the prediction models based on historical data that is associated with various durations of historical time periods that lead to the occurrences of the hazardous conditions. For example, because coke buildup is a hazardous condition that develops relatively more slowly than flooding (e.g., factors leading to coke buildup may develop over years and factors leading to flooding can develop over days or less), the threshold time period associated with predicting the likely occurrence of coke buildup may be relatively longer than a threshold time period associated with predicting the occurrence of flooding.

In some implementations, the control system may train a first prediction model to identify a particular hazardous condition when operating under a particular operating state and a second prediction model, that is different from the first prediction model, to identify the hazardous condition when operating under a second operating state that is different from the first operating state. Additionally, or alternatively, the control system may specifically configure the one or more prediction models to monitor for a particular hazardous condition. For example, one prediction model may be configured to predict that flooding is likely to occur (e.g., within a day or a week) and another prediction model may be configured to predict that coke buildup is likely to occur (e.g., within a month, several months, or a year).

In some implementations, a prediction model may include and/or be associated with a latent variable model (LVM) that is configured based on an internal state (e.g., a hidden state or non-visible state) of a distillation column and/or a transition from an operational (or normal) condition to a potentially hazard condition. An LVM may provide a data driven approach that can more accurately and/or efficiently (e.g., relative to other techniques, such a simulations) to identify a state of a distillation column, to identify an upset condition of the distillation column, and/or to predict a transition from an operation condition to a potentially hazardous condition. In this way, the control system may utilize a prediction model that enables relatively early detection of issues that permit the control system to transmit a corresponding notification (e.g., a warning message) to one or more operators, devices, or other systems associated with the distillation column. According to some implementations, the LVM (e.g., using a Kalman filter) can combine the historical data and/or principal rules, measurements, user inputs, along with other operational data (e.g., training data identified by the state detection model) to build the prediction models and/or train one or more other AI models of the control system in real-time. Moreover, some implementations may utilize a process model estimator (PME) that is configured as an on-demand predictive model that is used to relate a set of parameters (e.g., associated with a flow of vapors or liquids, from crude oil feed, through the distillation column) based on one or more physical and/or chemical principles. Additionally, or alternatively, the control system may provide and/or utilize a real-time optimization engine that enables anomaly forecasting for detection of certain hazardous conditions associated with an operation of the distillation column (e.g., to forecast flooding and/or forecast coke buildup within the distillation column).

As shown in FIG. 1C, and by reference number 125, the control system monitors the distillation column. For example, the control system may monitor sensor measurements and/or control settings (e.g., control device set points that are received and/or processed in real-time) of the distillation column using the state detection model and/or the one or more trained prediction models. Accordingly, the control system may determine the current operating state of the distillation column and use a corresponding prediction model to monitor the distillation column according to a data-driven approach rather than detect that a particular hazardous condition has occurred or is about to occur based purely on sensor measurements, as done in other control systems. In this way, the control system may proactively predict an impending hazardous condition to prevent or reduce the likelihood that the hazardous condition occurs within a threshold period of time.

As further shown in FIG. 1C, and by reference number 130, the control system determines and/or outputs the probability of the distillation column experiencing a hazardous condition. The probability may be associated with the likelihood that the distillation column experiences the hazardous condition within a threshold period of time (e.g., that is specific to the type of hazardous condition). The probability may correspond to an output from the prediction model associated with the operating state of the distillation column (e.g., an output that indicates a deviation from a healthy-state of the distillation column and/or a normal operating state of the distillation column). As shown, the control system may output the probability to the system user device (e.g., to permit an operator of the distillation column to monitor the distillation column and/or access the probability that the hazardous condition occurs). Additionally, or alternatively, the control system may provide a notification (or message) to the system user device that identifies the probability that the distillation column is going to experience the hazardous condition.

In some implementations, the control system may monitor the probability that the distillation column experiences the hazardous condition relative to a threshold probability (e.g., 70%, 90%, 95%, among other examples). The control system may use various probability thresholds that are specifically configured for various hazardous conditions and/or various operating states of the distillation column. Additionally, or alternatively, the various probability thresholds can be configured according to an operating input or setting of the distillation column. As described herein, when the control system detects that the probability that the distillation column experiences a hazardous condition under a current operating state satisfies (e.g., reaches or exceeds) the threshold probability, the control system may perform one or more actions associated with reducing the probability.

As further shown in FIG. 1C, and by reference number 135, the control system controls the distillation column to prevent the hazardous condition. For example, the control system may automatically adjust a setting of a control device of the distillation column to reduce a likelihood that the distillation column experiences the hazardous condition within a threshold time period. The control system may configure the setting based on one or more historical settings of the control device that are included within the historical control data. For example, the control system may use an optimization model that is trained according to the historical data and that is configured to learn or identify control settings that mitigate certain hazardous conditions and/or reduce the probability that a hazardous condition occurs within a threshold time period. In some implementations, the control system may adjust one or more settings of the control devices to transition the distillation column from one operating state to another (e.g., to an operating state that is less likely to cause the distillation column to experience the hazardous condition). In some implementations, the control system causes an alarm system associated with the distillation column to emit an alarm associated with the hazardous condition. For example, based on determining that the probability satisfies the probability threshold, the control system may emit the alarm to alert operators (or other individuals near the distillation column) that a hazardous condition is likely to occur and/or to indicate that the settings of one or more control devices are being adjusted.

As further shown in FIG. 1C, and by reference number 140, the control system may retrain one or more of the models of the control system. For example, the control system may obtain feedback associated with adjustments to set points of the control devices and/or associated with the determined (or output) probability of the distillation column experiencing the hazardous condition within the threshold time period. The control system may retrain the prediction model, the state detection model, and/or an optimization engine based on the feedback and/or operating data associated with the distillation column, such as the operating state, sensor measurements, and/or control set points of the control devices of the distillation column.

The feedback may be received (e.g., as a user input) from the system user device. Additionally, or alternatively, the feedback may be inferred from any adjustments to the control devices after the control system automatically adjusts the control devices to reduce the likelihood of the hazardous condition occurring. For example, if after a period of time, certain parameters are not within a difference threshold from an expected value, the control system may determine whether an adjustment to a set point of the control devices was inaccurate or accurate, and correspondingly retrain the prediction model based on whether the adjustment to the set point was inaccurate or accurate (e.g., to improve the accuracy of an optimization engine used to control the set points of the distillation column). Additionally or alternatively, if the control devices are not adjusted (e.g., by an operator) within a threshold period of time after the control system automatically adjusted the control devices, the control system may determine that a prediction that a hazardous condition was likely to occur was accurate. On the other hand, if the control system determines that the control devices were adjusted back to the previous settings (or the distillation column was returned to the previous operating state) within the threshold period of time, the control system may determine that the probability was inaccurate (or at least too high).

In this way, as described herein, a control system of a distillation column is configured to utilize one or more AI models to monitor and/or control a distillation column to reduce a likelihood that the distillation column experiences a hazardous condition, thereby extending the useful life of the distillation column and/or preventing a shutdown of the distillation column. Accordingly, as described herein, using a data driven approach, the control system can monitor a distillation column without the distillation column having to be outfitted with certain sensors, control devices, or other technologies that add complexity to the distillation column and/or that require the distillation column to shutdown for expensive and/or intrusive inspections.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
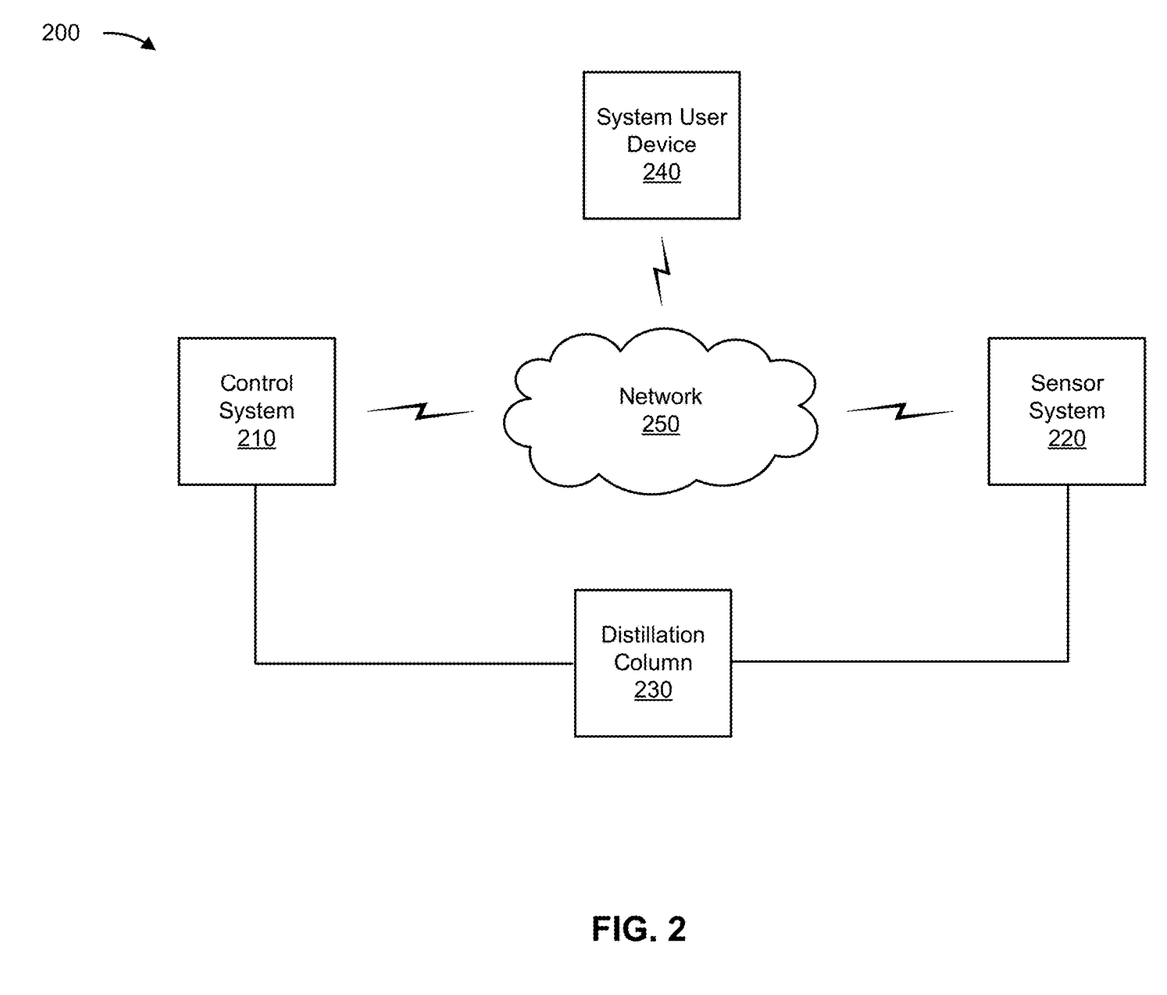
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a control system 210, a sensor system 220, a distillation column 230, a system user device 240, and a network 250. Devices of environment 200 may interconnect via wired connections, wireless connections, or a combination of wired and wireless connections.

The control system 210 may include one or more devices (and/or one or more components) that may be used to control an operation of the distillation column 230. For example, the control system 210 may include one or more actuators, one or more switches, one or more valves, one or more pumps, and/or any other controllable mechanisms that permit the control system to control a flow of a fluid (e.g., crude oil, one or more distilled vapors, and/or one or more distilled liquids) through one or more sections of the distillation column 230.

The sensor system 220 may include one or more devices that may be used to obtain measurements of one or more parameters of the distillation column 230, as described herein. For example, the sensor system may include a temperature sensor, a flow sensor, a pressure sensor, a chemical composition sensor, a concentration sensor, a flux sensor, a differential pressure sensor, a differential temperature sensor, and/or any other type of sensor that can be used to measure a parameter at one or more locations of the distillation column 230 and/or one or more locations associated with one or more devices of the control system 210.

The system user device 240 includes one or more devices capable of receiving, generating, storing, processing, and/or providing information associated with monitoring and controlling an operation of a distillation column, as described elsewhere herein. The system user device 240 may include a communication device and/or a computing device. For example, the system user device 240 may include a wireless communication device, a mobile phone, a user equipment, a laptop computer, a tablet computer, a desktop computer, or a similar type of device.

The network 250 includes one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
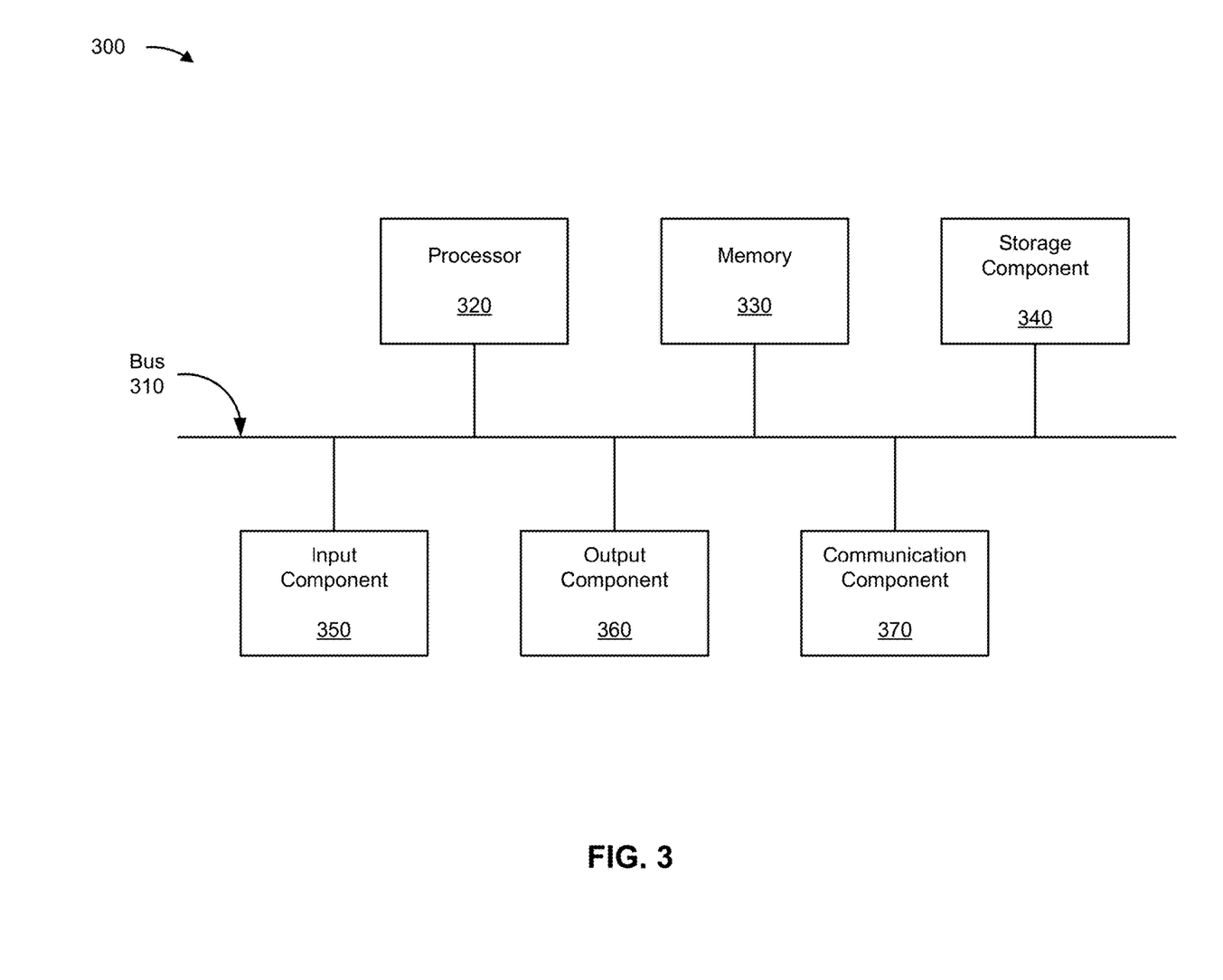
FIG. 3 is a diagram of example components of one or more devices of FIG. 2.

FIG. 3 is a diagram of example components of a device 300, which may correspond to the control system 210, the sensor system 220, and/or the system user device 240. In some implementations, the control system 210, the sensor system 220, and/or the system user device 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340)

may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
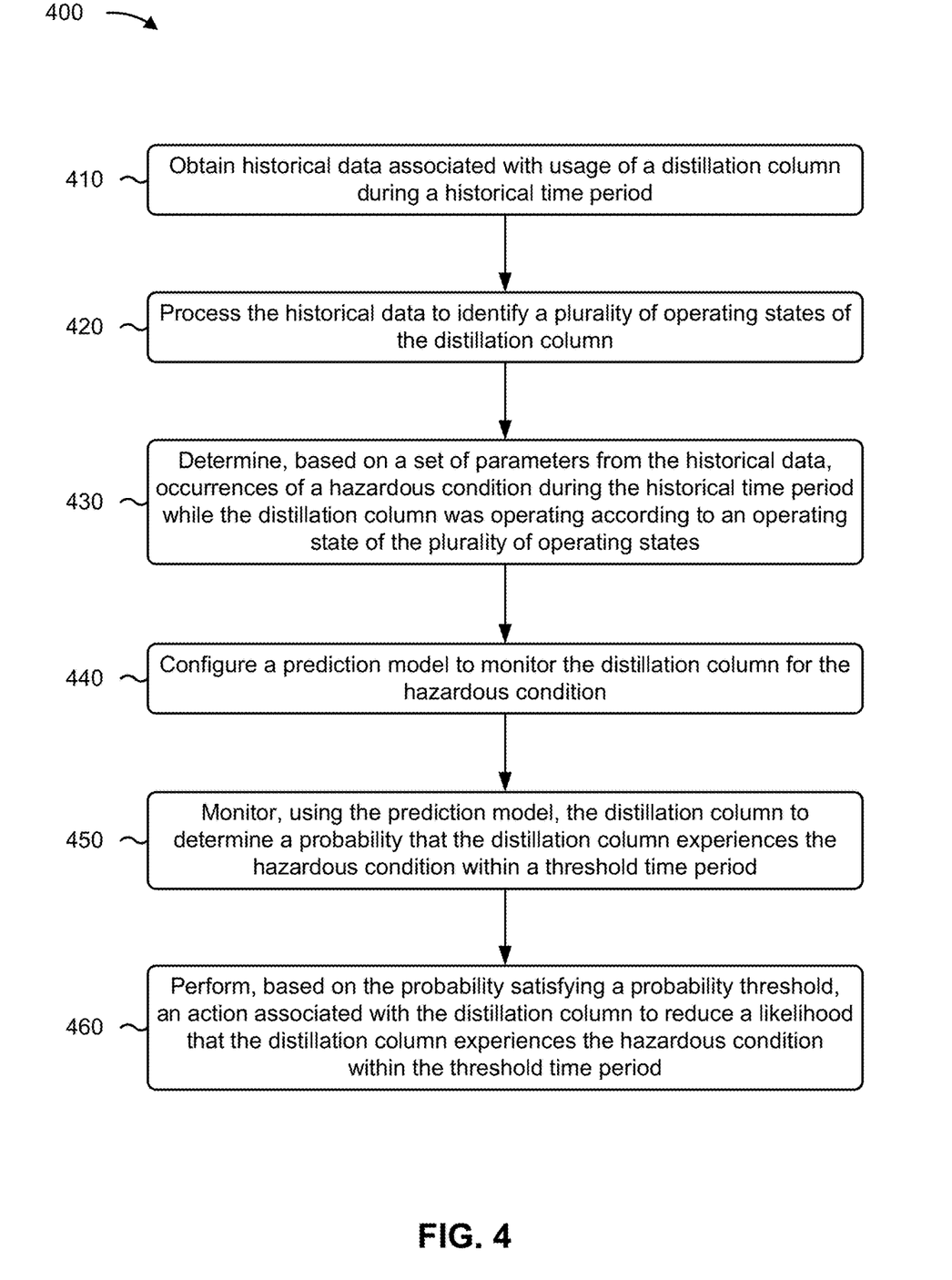
FIG. 4 is a flowchart of an example process relating to monitoring and/or controlling an operation of a distillation column.

FIG. 4 is a flowchart of an example process 400 associated with monitoring and controlling an operation of a distillation column. In some implementations, one or more process blocks of FIG. 4 may be performed by a control system (e.g., control system 210). In some implementations, one or more process blocks of FIG. 4 may be performed by another device or a group of devices separate from or including the control system, such as a sensor system (e.g., the sensor system 220), and/or a system user device (e.g., the system user device 230). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining historical data associated with usage of a distillation column during a historical time period (block 410). For example, the control system may obtain historical data associated with usage of a distillation column during a historical time period, as described above.

As further shown in FIG. 4, process 400 may include processing the historical data to identify a plurality of operating states of the distillation column (block 420). For example, the control system may process the historical data to identify a plurality of operating states of the distillation column, as described above.

As further shown in FIG. 4, process 400 may include determining, based on a set of parameters from the historical data, occurrences of a hazardous condition during the historical time period while the distillation column was operating according to an operating state of the plurality of operating states (block 430). For example, the control system may determine, based on a set of parameters from the historical data, occurrences of a hazardous condition during the historical time period while the distillation column was operating according to an operating state of the plurality of operating states, as described above.

As further shown in FIG. 4, process 400 may include configuring a prediction model to monitor the distillation column for the hazardous condition (block 440). For example, the control system may configure a prediction model to monitor the distillation column for the hazardous condition, as described above. In some implementations, the prediction model is trained based on training data that is associated with the occurrences of the hazardous condition.

As further shown in FIG. 4, process 400 may include monitoring, using the prediction model, the distillation column to determine a probability that the distillation column experiences the hazardous condition within a threshold time period (block 450). For example, the control system may monitor, using the prediction model, the distillation column to determine a probability that the distillation column experiences the hazardous condition within a threshold time period, as described above. In some implementations, the prediction model is configured to determine the probability based on measurements from a set of sensors of the distillation column.

As further shown in FIG. 4, process 400 may include performing, based on the probability satisfying a probability threshold, an action associated with the distillation column to reduce a likelihood that the distillation column experiences the hazardous condition within the threshold time period (block 460). For example, the control system may perform, based on the probability satisfying a probability threshold, an action associated with the distillation column to reduce a likelihood that the distillation column experiences the hazardous condition within the threshold time period, as described above.

Process 400 may include additional implementations, such as any single implementation or any combination of implementations described below and/or in connection with one or more other processes described elsewhere herein.

In a first implementation, processing the historical data to identify the plurality of operating states comprises performing a clustering technique to classify the historical data into corresponding subsets of historical data for individual operating states of the plurality of operating states, and defining the individual operating states according to the corresponding subsets of historical data.

In a second implementation, the clustering technique is performed using at least one of a K-means clustering model, or a Gaussian mixture model. In a third implementation, the training data includes historical sensor data and historical control data that is associated with a second set of parameters, wherein the historical sensor data and the historical control data are included in the historical data. In a fourth implementation, the historical sensor data includes historical measurements that correspond to the measurements from the set of sensors.

In a fifth implementation, performing the action comprises configuring a setting of a control device associated with an operation of the distillation column, wherein the setting is based on one or more historical settings of the control device that are included within the historical control data. In a sixth implementation, performing the action comprises at least one of providing, to a user device, a notification that identifies the probability that the distillation column is going to experience the hazardous condition, or causing an alarm system associated with the distillation column to emit an alarm associated with the hazardous condition. In a seventh implementation, performing the action comprises providing, to a user device, a notification that indicates that the probability satisfies the probability threshold, receiving, from the user device, feedback associated with the probability, and retraining the prediction model based on the probability and the feedback.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining, by a device, historical data associated with usage of a distillation column during a historical time period;
    processing, by the device, the historical data to identify a plurality of operating states of the distillation column;
    determining, by the device and based on a set of parameters from the historical data, occurrences of a hazardous condition during the historical time period while the distillation column was operating according to an operating state of the plurality of operating states;
    configuring, by the device, a prediction model to monitor the distillation column for the hazardous condition,
        wherein the prediction model is trained based on training data that is associated with the occurrences of the hazardous condition;
    monitoring, by the device and using the prediction model, the distillation column to determine a probability that the distillation column experiences the hazardous condition within a threshold time period,
        wherein the prediction model is configured to determine the probability based on measurements from a set of sensors of the distillation column; and
    performing, by the device and based on the probability satisfying a probability threshold, an action associated with the distillation column to reduce a likelihood that the distillation column experiences the hazardous condition within the threshold time period.

2. The method of claim 1, wherein processing the historical data to identify the plurality of operating states comprises:
    performing a clustering technique to classify the historical data into corresponding subsets of historical data for individual operating states of the plurality of operating states; and
    defining the individual operating states according to the corresponding subsets of historical data.

3. The method of claim 2, wherein the clustering technique is performed using at least one of:
    a K-means clustering model, or
    a Gaussian mixture model.

4. The method of claim 1, wherein the training data includes historical sensor data and historical control data that is associated with a second set of parameters,
    wherein the historical sensor data and the historical control data are included in the historical data.

5. The method of claim 4, wherein the historical sensor data includes historical measurements that correspond to the measurements from the set of sensors.

6. The method of claim 4, wherein performing the action comprises:
    configuring a setting of a control device associated with an operation of the distillation column,
        wherein the setting is based on one or more historical settings of the control device that are included within the historical control data.

7. The method of claim 1, wherein performing the action comprises at least one of:
    providing, to a user device, a notification that identifies the probability that the distillation column is going to experience the hazardous condition; or
    causing an alarm system associated with the distillation column to emit an alarm associated with the hazardous condition.

8. The method of claim 1, wherein performing the action comprises:
    providing, to a user device, a notification that indicates that the probability satisfies the probability threshold;
    receiving, from the user device, feedback associated with the probability; and
    retraining the prediction model based on the probability and the feedback.

9. A device, comprising:
one or more memories; and
one or more processors, communicatively coupled to the one or more memories, configured to:
processes, using a clustering technique, historical data to identify a plurality of operating states of a distillation column;
determine, based on a first set of parameters from the historical data, occurrences of a hazardous condition during a historical time period while the distillation column was operating according to an operating state of the plurality of operating states;
generate a prediction model for monitoring the distillation column for the hazardous condition;
train the prediction model based on training data that is associated with the occurrences of the hazardous condition,
wherein the training data includes historical sensor data and historical control data that is associated with a second set of parameters;
monitor, using the prediction model, the distillation column to determine a probability that the distillation column is going to experience the hazardous condition within a threshold time period,
wherein the prediction model is configured to determine the probability based on measurements from a set of sensors of the distillation column; and
perform, based on the probability satisfying a probability threshold, an action associated with the distillation column.

10. The device of claim 9, wherein the hazardous condition comprises at least one of:
flooding of a tray of the distillation column; or
coke buildup within the distillation column.

11. The device of claim 9, wherein the historical sensor data includes historical measurements that correspond to the measurements from the set of sensors.

12. The device of claim 11, wherein the one or more processors, when performing the action, are configured to:
configure one or more control devices associated with one or more operations of the distillation column.

13. The device of claim 9, wherein the prediction model comprises at least one of:
a latent variable model;
a Kalman filter; or
a process model estimator.

14. The device of claim 9, wherein the one or more processors, when performing the action, are configured to at least one of:
automatically adjust a setting of a control device of the distillation column to reduce a likelihood that the distillation column experiences the hazardous condition within the threshold time period;
provide, to a user device, a notification that identifies the probability that the distillation column is going to experience the hazardous condition; or
cause an alarm system associated with the distillation column to emit an alarm associated with the hazardous condition.

15. A system comprising:
a distillation column;
a plurality of sensors to monitor a flow of fluid through the distillation column;
one or more control devices to control the flow of fluid through the distillation column; and
a controller that is configured to:
obtain historical data associated with the distillation column;
process the historical data to identify a plurality of operating states of the distillation column;
determine, based on a set of parameters from the historical data, occurrences of a hazardous condition during a historical time period while the distillation column was operating according to an operating state of the plurality of operating states;
generate a prediction model to monitor the distillation column for the hazardous condition;
train the prediction model based on training data that is associated with the occurrences of the hazardous condition; and
perform an action associated with monitoring the distillation column using the prediction model.

16. The system of claim 15, wherein the training data comprises at least one of:
a subset of the historical data that is associated with one or more time periods prior to respective occurrences of the hazardous condition.

17. The system of claim 16, wherein the controller is further configured to:
configure one or more control devices associated with one or more operations of the distillation column.

18. The system of claim 15, wherein the set of parameters comprises at least one of:
a temperature at one or more locations of the distillation column;
a pressure at one or more locations of the distillation column;
a vapor flow rate at one or more locations of the distillation column;
a level of liquid at one or more locations of the distillation column;
a fluid composition identified by a concentration sensor; or
a heat exchange rate identified by a flux sensor.

19. The system of claim 15, wherein the prediction model comprises at least one of:
a latent variable model;
a Kalman filter; or
a process model estimator.

20. The system of claim 15, wherein the controller, when performing the action, is configured to:
receive, from a set of sensors of the plurality of sensors, one or more measurements associated with the distillation column;
process, using the prediction model, the one or more measurements to determine a probability that the distillation column experiences the hazardous condition within a threshold time period; and
cause a control device, of the one or more control devices, to adjust a setting to reduce a likelihood that the distillation column experiences the hazardous condition within the threshold time period.

* * * * *